US006940910B2

(12) United States Patent
Jun et al.

(10) Patent No.: US 6,940,910 B2
(45) Date of Patent: Sep. 6, 2005

(54) METHOD OF DETECTING DISSOLVE/FADE IN MPEG-COMPRESSED VIDEO ENVIRONMENT

(75) Inventors: Sung Bae Jun, Seoul (KR); Kyoung Ro Yoon, Seoul (KR)

(73) Assignee: LG Electronics Inc., Seoul (KR)

(*) Notice: Subject to any disclaimer, the term of this patent is extended or adjusted under 35 U.S.C. 154(b) by 834 days.

(21) Appl. No.: 09/797,962

(22) Filed: Mar. 5, 2001

(65) Prior Publication Data

US 2001/0021267 A1 Sep. 13, 2001

(30) Foreign Application Priority Data

Mar. 7, 2000 (KR) ........................................ 2000-11334

(51) Int. Cl.[7] .......................... H04N 7/12; H04N 11/02; H04N 11/04

(52) U.S. Cl. .............................. 375/240.26; 375/240.15

(58) Field of Search ....................... 375/240.26, 240.25, 375/240.24; 348/699, 700

(56) References Cited

U.S. PATENT DOCUMENTS

| | | | | | |
|---|---|---|---|---|---|
| 5,911,008 | A | * | 6/1999 | Niikura et al. | 382/236 |
| 5,959,697 | A | * | 9/1999 | Coleman, Jr. | 348/700 |
| 6,061,471 | A | * | 5/2000 | Coleman, Jr. | 382/173 |
| 6,195,458 | B1 | * | 2/2001 | Warnick et al. | 382/173 |
| 6,393,054 | B1 | * | 5/2002 | Altunbasak et al. | 375/240 |
| 6,459,459 | B1 | * | 10/2002 | Ratakonda | 348/700 |
| 6,721,454 | B1 | * | 4/2004 | Qian et al. | 382/224 |

FOREIGN PATENT DOCUMENTS

| | | | |
|---|---|---|---|
| EP | 0675495 | A2 | 10/1995 |
| EP | 0780844 | A2 | 6/1997 |
| EP | 0938054 | A2 | 8/1999 |
| JP | 11-008854 | | 1/1999 |
| JP | 11-191862 | | 7/1999 |
| JP | 2000-261810 | | 9/2000 |
| WO | WO 99/32993 | | 7/1999 |

OTHER PUBLICATIONS

Liu et al., "Scene Decomposition of MPEG Compressed Video", Feb. 7, 1995, pp 26–37, University of Washington, Seattle, WA.

Alattar, "Detecting and Compressing Dissolve Regions in Video Sequences with a DVI Multimeida Image Compression Algorith" May 3, 1993, pp 13–16, ISCS, US, New York, IEEE.

Alatta, "Wipe Scene Change Detector For use with Video Compression Algorithms and MPEG–7", Feb. 1, 1998, pp 43–51, IEEE Inc. New York, US.

Feng et al., "Scene Change Detection Algorithm for MPEG Video Sequence", Sep. 16, 1996, pp 821–824, ICIP, US, New York, IEEE.

H.H. Yu, "A Hierarchical Multiresolution Video Shot Transition Detection Scheme", Jul. 1999, pp 196–213, Academic Press, vol. 75, No. 1/02.

Meng et al., "Scene Change Detection in a MPEG Compressed Video Sequence", Feb. 7, 1995, pp 26–37, The SPIE vol. 2419.

* cited by examiner

*Primary Examiner*—Chris Kelley
*Assistant Examiner*—Charles Parsons
(74) *Attorney, Agent, or Firm*—Fleshner & Kim, LLP

(57) ABSTRACT

There is provided a method of detecting dissolve/fade in an MPEG-compressed video environment, which includes the steps of: detecting a candidate sequence that is presumed to use a dissolve/fade editing effect according to shot transition detection in a video sequence; finding if spatio-temporal macro block type distribution that characteristically appears in a dissolve/fade sequence arises in the dissolve/fade candidate sequence, to judge if a scene transition by dissolve/fade was used in the detected dissolve/fade candidate sequence; and when the spatio-temporal macro block type distribution in the dissolve/fade sequence continuously appears in the dissolve/fade candidate sequence, comparing the length of the candidate sequence with a predetermined critical value and finally judging that the candidate sequence is a dissolve/fade sequence when its length is longer than the threshold.

24 Claims, 4 Drawing Sheets

METHOD OF DETECTING DISSOLVE/FADE IN MPEG-COMPRESSED VIDEO ENVIRONMENT

BACKGROUND OF THE INVENTION

1. Field of the Invention

The present invention relates to a method of detecting dissolve/fade in an MPEG-compressed video environment, and more particularly, to a method of detecting a dissolve/fade sequence using spatio-temporal macro block type distribution in a compressed video environment, to effectively detect dissolve/fade in video streams.

2. Description of the Related Art

To watch a desired video (moving picture such as movie, drama, news, documentary, etc.) through TV and video media, a user should watch the entire program at a fixed televising time. With the development in digital technology and image/video recognition techniques in recent years, however, users can search and browse a desired part of a desired video at a desired time. A basic technique for non-linear browsing and searching includes a shot segmentation and a shot clustering. A variety of studies are being performed for the shot segmentation technique while researches with respect to the shot clustering technique are at the initial stage.

A shot is a sequence of video frames obtained by one camera without interruption. The shot is a basic unit for analyzing or constructing a video content. Video is generally configured of a connection of lots of shots and various video editing effects are used according to methods of connecting the shots. The video editing effects include an abrupt shot transition and a gradual shot transition. The abrupt shot transition is a technique whereby the current picture is abruptly changed into another picture. This abrupt shot transition is also called hard cut and prevalently used. The gradual shot transition is a technique whereby a picture is gradually changed into another picture. The gradual shot transition includes fade, dissolve, wipe and other special effects. Among these, the fade and dissolve are most frequently used.

Shot segmentation represents a process of extracting temporal information, such as frame numbers, of each shot of a video based on the transition detection.

There are many shot transition detection algorithms that can be categorized as three conventional methods for detecting the gradual shot transition. The first one is a twin comparison technique based on a color histogram difference between frames. This technique has erroneous detection and non-detection and slower performance speed because it is based on only the global color histogram difference between frames. The second method is a dissolve/fade detection technique based on the variance of global brightness distribution of frames. This technique uses brightness variation characteristic in I-frames and P-frames of a fade/dissolve sequence including a brightness variance graph that has a parabolic form and very large difference between the maximum and minimum values and the editing effect of dissolve or fade lasts over several to tens frames. However, the brightness variance distribution uses a basis for detecting the dissolve/fade effect in this method frequently appears even in a sequence where dissolve/fade is not generated. Moreover, the brightness variance distribution may not arise in the sequence where the dissolve/fade is generated in many cases.

The third method is a dissolve/fade detecting technique based on edge distribution in an image according to an edge detection algorithm and analysis of moving picture characteristic of the detected edge. This method passes through a preprocessing step of detecting edges from image data, a step of dividing the detected edges into entering edges and exiting edges using the moving picture characteristic and calculating an edge variation rate on the basis of the divided edges, and a post-processing step of classifying editing effects using spatio-temporal distribution of the entering edges and exiting edges, to detect the editing effects of hard cut, dissolve, fade and wipe. However, this method has very a slow performance speed because most images must be actually decoded basically and the edge detection operation requires relatively long period of time.

SUMMARY OF THE INVENTION

It is, therefore, an object of the present invention to provide a method of detecting dissolve/fade in an MPEG-compressed video environment, which rapidly and accurately detects a sequence where dissolve/fade is generated based on spatio-temporal macro block type distribution in a video compression domain using bi-directional prediction between frames.

To accomplish the object of the present invention, there is provided a method of detecting dissolve/fade in an MPEG-compressed video environment, comprising the steps of: detecting a candidate sequence that is presumed to use a dissolve/fade editing effect according to shot transition detection in a video sequence; finding if spatio-temporal macro block type distribution that characteristically appears in a dissolve/fade sequence arises in the dissolve/fade candidate sequence, to judge if a scene transition by dissolve/fade was used in the detected dissolve/fade candidate sequence, and when the spatio-temporal macro block type distribution in the dissolve/fade sequence continuously appears in the dissolve/fade candidate sequence, comparing the length of the candidate sequence with a predetermined critical value and finally judging that the candidate sequence is a dissolve/fade sequence when its length is longer than the critical value.

DETAILED DESCRIPTION OF THE PREFERRED EMBODIMENT

Reference will now be made in detail to the preferred embodiments of the present invention, examples of which are illustrated in the accompanying drawings.

Figure 1:
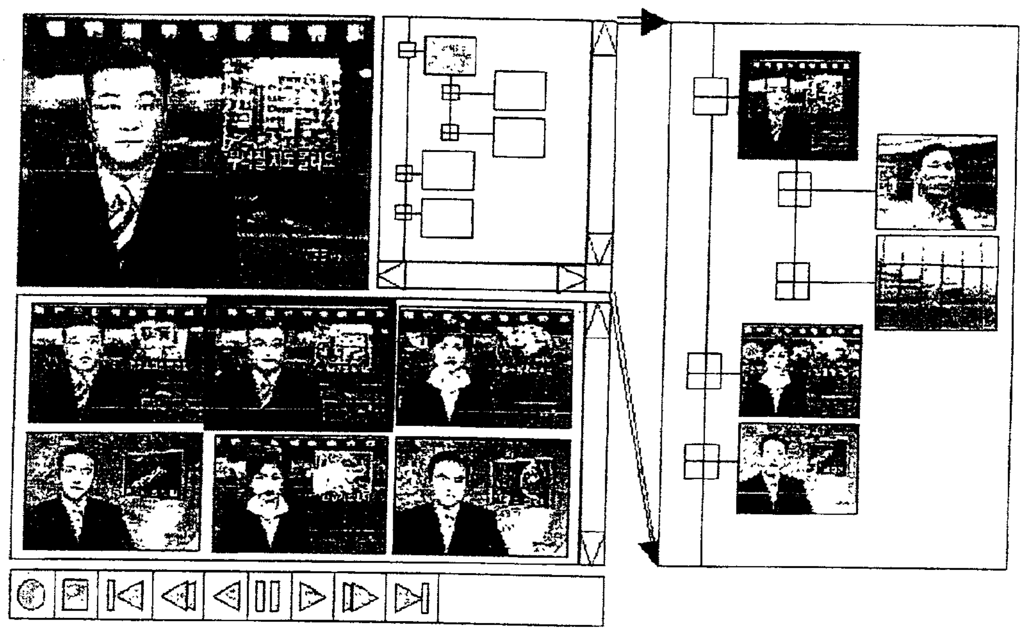
FIG. 1 shows a non-linear video browsing interface according to an embodiment of the present invention.

FIG. 1 shows a non-linear video browsing interface according to an embodiment of the present invention. This interface is very useful in digital video browsing because a user can easily access only a desired part of video by searching main parts thereof using the interface without watching the whole part of the video. The most essential technique for video browsing includes the shot segmentation and shot clustering. The relationship between the shot segmentation and shot clustering is explained below with reference to FIG. 2.

Figure 2:
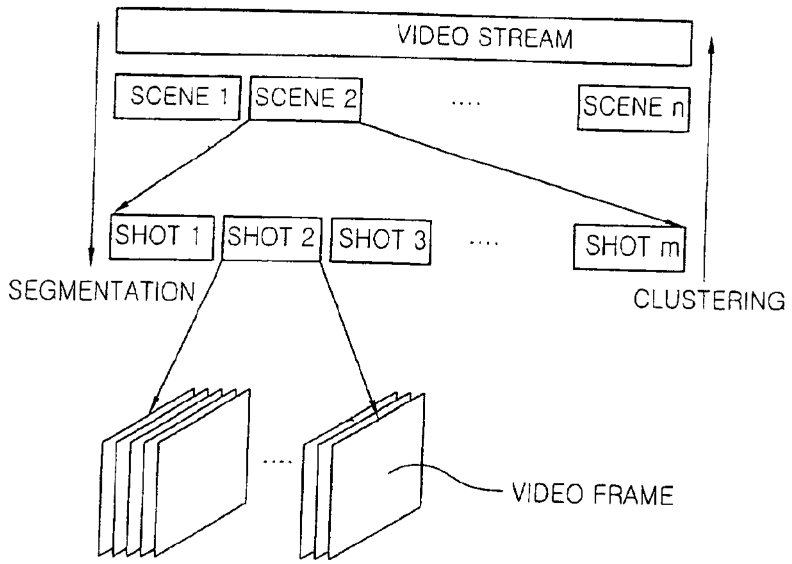
FIG. 2 shows a relationship between the shot segmentation and shot clustering according to the present invention.

FIG. 2 shows the relationship between the shot segmentation and shot clustering according to the present invention. Referring to FIG. 2, a video stream is configured of a logically constructed connection of scenes. Each scene is configured of a connection of a lot of shots. The shot segmentation is a technique for dividing the video stream into individual shots. The shot clustering is a technique of grouping similar shots on the basis of similarity of time/image/motion/audio to construct a video structure in units of logically constructed scenes.

A video editing effect is classified based on methods of connecting the shots. The editing effect includes the abrupt transition, that is, hard cut, and gradual transition such as dissolve, fade, wipe and other special effects. The dissolve and fade are most frequently used for gradual connection of two shots or scenes in video edition. The dissolve is a technique that two scenes are overlapped with each other to be gradually changed from one scene to the other scene. The fade is a technique that a scene fades out or in, being gradually changed into another scene.

Figure 3:
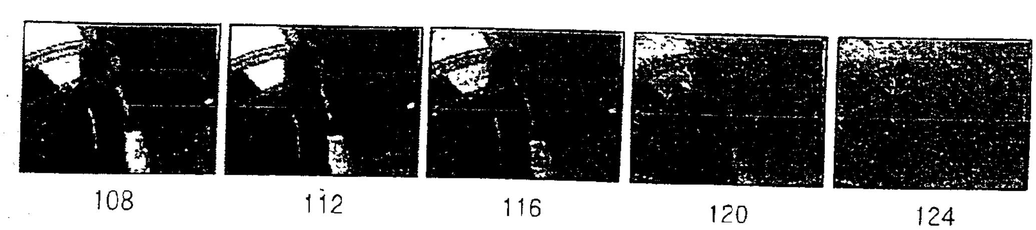
FIG. 3 shows an example of shot transition by dissolve in a video sequence in accordance with the present invention.

There is described below a method of detecting fade and dissolve using spatio-temporal macro block type distribution of a video MPEG-compressed according to bi-directional prediction between frames with reference to FIGS. 3 to 6. FIG. 3 shows an example of shot transition by dissolve in a video sequence in accordance with the present invention. Referring to FIG. 3, as the video sequence proceeds, transition from one scene 108 into another scene 124 occurs, and in between, the two scenes overlap each other.

When the shot transition sequence detected using dissolve/fade is analyzed in the video, it has the following characteristics. Firstly, there is a considerable difference between color distributions of the starting scene and ending scene of the dissolve/fade. Secondly, the dissolve/fade generally lasts for more than several frames. Thirdly, the first scene gradually becomes dim and the second scene gradually becomes bright in the dissolve/fade. Finally, pixels that become dim and pixels that become bright spatially widely distribute. On the basis of these characteristics, the present invention realizes an algorithm for effectively detecting the dissolve/fade using spatio-temporal macro block type distribution characteristic in B-frames that simultaneously use bi-directional prediction in the compression domain.

A procedure for realizing the algorithm is as follows.

First of all, a candidate sequence that is presumed to use the dissolve/fade technique is detected from a video sequence through shot transition detection. This candidate sequence is judged to be a sequence where the dissolve/fade was generated when a color histogram difference between the first frame and the last frame of a scene where the dissolve/fade is detected is larger than a predetermined threshold. This can be represented by the following expression.

$$HistDiff(f_b, f_e) > \tau_{color} \quad (1)$$

Where $f_b$ is the starting frame of dissolve/fade scene, $f_e$ is the ending frame of the dissolve/fade scene, $HistDiff(f_b, f_e)$ is the color histogram difference between $f_b$ and $f_e$, and $\tau_{color}$ is the predetermined threshold for judgement of the generation of shot transition based on the color histogram difference.

The candidate sequence can be detected using a method of detecting the shot transition based on global color distribution difference between frames, The candidate sequence can also be detected using a method based on the spatio-temporal macro block distribution and a method based on spatio-temporal edge distribution and variation form characteristics. There are explained methods of detecting the frames $f_b$, $f_e$ serving as a base of color distribution comparison in the method using the color distribution difference. For example, there is a method of selecting a frame of one-step interval from a reference frame. Another method is to detect I-frames as the candidate sequence ($[f_b, f_3]$), which uses only intra coded blocks in video CODEC such as H.xxx or MPEG.

It is judged if there is a hard cut in the dissolve/fade candidate sequence ($[f_b, f_e]$) detected as above. This can improve accuracy in the dissolve/fade detection algorithm. The hard cut is detected through a variety of methods including a technique using an image difference between two frames according to global color distribution difference based on color histogram, a technique using spatio-temporal macro block distribution and its variation characteristic and a technique using spatio-temporal motion vector characteristic, spatio-temporal edge distribution through edge detection and its variation characteristic.

In case where it is judged that there is no hard cut, it is found if the dissolve/fade editing effect was used in the detected dissolve/fade candidate sequence ($[f_b, f_e]$) based on existence of spatio-temporal macro block type distribution that characteristically appears in dissolve/fade sequence. Checking of the spatio-temporal macro block type distribution is performed on B-frames that are coded using bi-directional prediction between frames. The selected B-frames are adjacent to anchor frames in the candidate sequence ($[f_b, f_e]$). The anchor frames are I-frames or P-frames serving as a base of motion prediction/compensation between frames. The above-described B-frames, I-frames and P-frames are explained below in detail with reference to FIG. 4.

Figure 4:
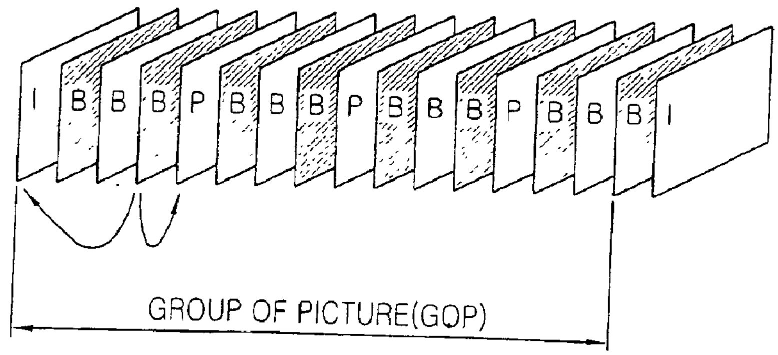
FIG. 4 shows the structure of GOP in an MPEG video sequence according to the present invention.

FIG. 4 shows a structure of GOP (Group of Picture) in an MPEG video sequence according to the present invention. The GOP is one of specific MPEG video sequences. In FIG. 4, black-colored frames represent B-frames adjacent to anchor frames and these frames are accessed to detect the dissolve/fade in minimal decoding domain. The anchor frames serve as a base frame for prediction/motion compensation between frames, and the B-frame has two anchor frames all the time. In the present invention, only B-frames adjacent to anchor frames are accessed without accessing all of the B-frames in order to reduce or minimize decoding, while the dissolve/fade can still be accurately detected.

An embodiment to obtain a dissolve/fade candidate sequence ($[f_{b'}, f_{e'}]$) in the candidate sequence ($[f_b, f_e]$) that satisfies the spatio-temporal macro block distribution characteristic of the dissolve/fade sequence will now be described.

The larger value between forward prediction rate and backward prediction rate can be determined to be larger than a predetermined critical value. This is represented by the following expressions.

$$\mathrm{Max}(M_{fwd}/(M_{fwd}+M_{bwd}),/M_{bwd}(M_{fwd}+M_{bwd}))>\tau_r \quad (2)$$

$$(\text{if } M_{fwd}+M_{bwd}\neq 0)$$

$$SpatDist(\mathrm{MinType}(M_{fwd}, M_{bwd}))>\tau_S \quad (3)$$

$$(\text{if } M_{fwd} \cdot M_{bwd}=0)$$

$$\mathrm{Min\ Type}(M_X, M_Y)=X(if\ M_X<M_Y) \quad (4)$$

$$\mathrm{Min\ Type}(M_X, M_Y)=Y(if\ M_X>M_Y) \quad (5)$$

Where $M_{fwd}$ is the number of forward prediction macro blocks of frame, $M_{bwd}$ is the number of backward prediction macro blocks of frame, $\tau_t$ is the critical value for the ratio of forward prediction and backward prediction, $M_{fwd}/(M_{fwd}+M_{bwd})$ is the forward prediction rate, $M_{bwd}/(M_{fwd}+M_{bwd})$ is the backward prediction rate, SpatDist(A) is spatial distribution measurement function of macro blocks whose type is A in an image, and $\tau_S$ is a critical value for the spatial distribution measurement of macro blocks. If a B-frame in the candidate sequence satisfies (2) and (3), the B-frame will be set to 1.

After the aforementioned procedure, there is detected the candidate sequence ($[f_{b'}, f_{e'}]$) having the maximum length among runs set to 1 among the B-frames adjacent to the anchor frames within the obtained sequence ($[f_b, f_e]$).

Figure 5A:
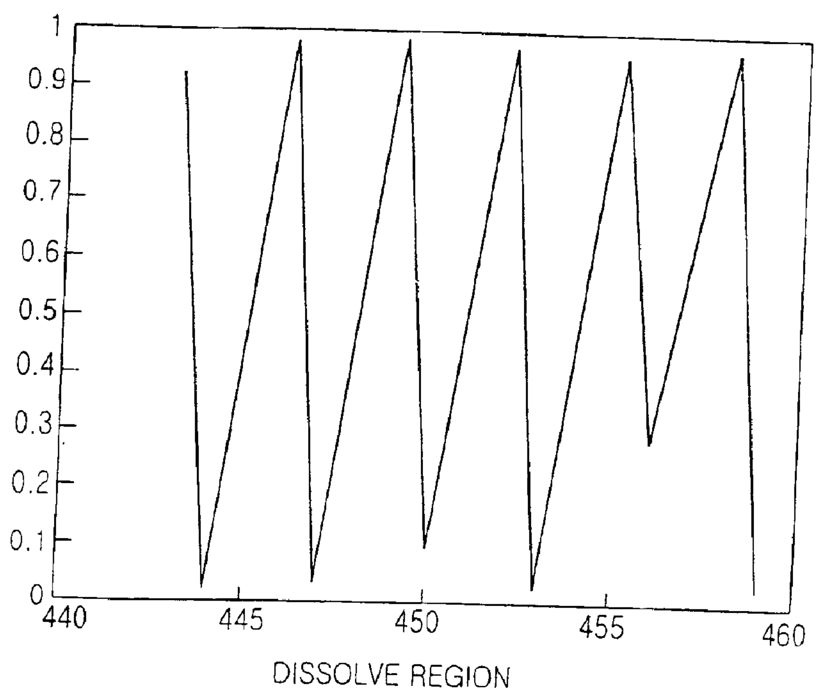
FIGS. 5A and 5B are graphs showing forward prediction rates in a dissolve/fade sequence and a non-dissolve/fade sequence in an MPEG video sequence according to the present invention, respectively.
Figure 5B:
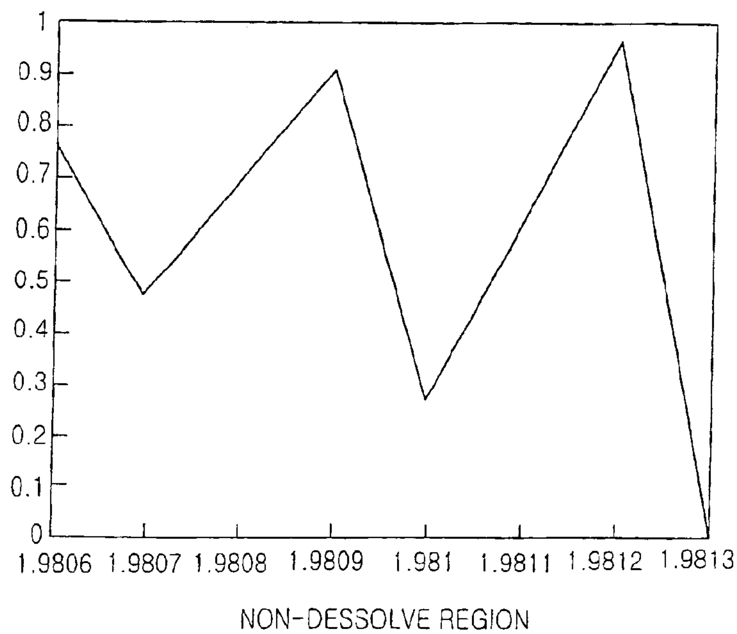

When the larger value between the forward prediction rate and backward prediction rate is larger than the specific threshold (expression (2)), the forward or backward prediction rate is considerably high in the B-frames adjacent to the anchor frames in the dissolve/fade sequence. The expressions model that this phenomenon continuously appears in the dissolve sequence. Moreover, the above expressions use characteristics that macro block prediction rate is much higher and appears continuously in the dissolve/fade sequence although it is general that more macro blocks are predicted from closer anchor frames in the B-frames. These characteristics are represented by graphs of FIGS. 5A and 5B. FIGS. 5A and 5B are graphs showing forward prediction rates in a dissolve/fade sequence and a non-dissolve/fade sequence in an MPEG video sequence according to the present invention, respectively.

The expression (3) represents the forward prediction macro blocks and backward prediction macro blocks are globally scattered in the spatial domain. The expression is for reducing erroneous detection rate in the entire algorithm.

The spatial distribution measurement function is a method of judging how much a specific type macro block is spatially globally distributed in an image. As an example, SpatDist (A) for measuring spatial distribution of A-type macro block can be represented by the following expression.

$$SpatDist(A)=C_A/T_A \tag{6}$$

Where $C_A$ is the total number of connected components on the basis of type A, and $T_A$ is the total number of A-type macro blocks in an image.

Figure 6:
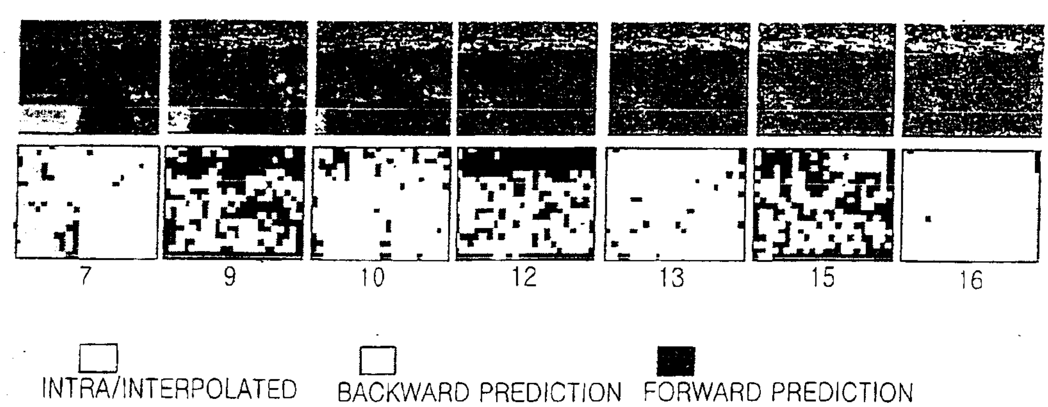
FIG. 6 shows distributions by macro block types in B-frames adjacent to anchor frames in a dissolve sequence according to the present invention.

FIG. 6 shows distributions of macro block types in B-frames adjacent to the anchor frame in a dissolve sequence according to the present invention. The function that induces the forward prediction macro block and backward prediction macro block to globally scattered in the spatial domain is the spatial distribution measurement function that judges that macro blocks of two types globally scattered in the image. This function has higher value as the macro blocks of two types are more globally distributed. The spatial distribution measurement function is decided by a value obtained by dividing the number of connected components of a specific type macro block by the number of a specific type macro block in an image.

In the analysis of the spatial distribution measurement, a macro block type in smaller numbers is selected but, if required, a macro block type in larger numbers can be selected for checking the spatial distribution.

After passing through the above procedures, the dissolve/fade detecting algorithm using the spatio-temporal macro block type distribution applies time constraints in order to judge if a corresponding candidate sequence is an actual scene transition sequence accordingly to dissolve/fade. That is, the corresponding sequence is judged to be the scene transition sequence by dissolve/fade when the spatio-temporal characteristic of the macro block type distribution in B-frames continuously appears for a predetermined period of time in the dissolve/fade sequence. On the other hand, it is judged that the corresponding sequence is not the scene transition sequence by dissolve/fade when it is not. The length of the dissolve/fade candidate sequence ($[f_b, f_e]$) or ($[f_{b'}, f_{e'}]$) having the maximum length, which was detected through the above procedure, is compared with a specific threshold($\tau_t$). When the length is larger than the threshold value, this sequence ($[f_b, f_e]$) or ($[f_{b'}, f_{e'}]$) is decided as the dissolve/fade sequence, thereby detecting dissolve/fade. This is represented by the following expression.

$$[e'-b']=\tau_t \tag{7}$$

where $\tau_t$ is a modeled duration.

Furthermore, when variance of colors of the first scene of the dissolve/fade candidate sequence obtained through the above procedures is lower than a predetermined critical value, the sequence is judged to be fade-in. When variance of colors of its last scene is lower than the critical value, the sequence is judged to be fade-out. The sequence is judged to be dissolve in other cases. Accordingly, the dissolve and fade can be discriminated from each other by the following expressions.

if $\text{Color}Dist(f_{start})<\tau_d$ then Fade-In else if $\text{Color}Dist(f_{end})<\tau_d$ then Fade-Out else dissolve ColorDist($f_1$) is a measure for indicating how various colors compose the image of frame $f_1$ and it can be applied to only pixels that are sampled on the specific basis. In the above expressions, $\tau_d$ is a threshold for deciding fade-in and fade-out, $f_{start}$ is the starting point of time of dissolve/fade, and $f_{end}$ is the ending point of time of dissolve/fade. $f_{start}$ can use $f_b$ or $f_{b'}$ and $f_{end}$ can use $f_e$ or $f_{e'}$. The above expressions use a characteristic that a picture starts from a simple scene in fade-in and the picture becomes simple in fade-out.

As distinguished from the conventional algorithm of detecting dissolve/fade, the present invention detects the dissolve/fade using the spatio-temporal macro block type distribution and its variation form in B-frames that compensate motions and perform bi-directional prediction in minimal decoding domain.

The dissolve/fade detecting method of the invention has a performance speed higher than the conventional algorithm because its processing is carried out in the minimal decoding domain. Furthermore, it is robust against fast camera motions or large motion information of a large object. Moreover, the present invention provides an algorithm capable of rapidly and accurately detecting fade/dissolve effects widely used among the gradual shot transition in the shot segmentation field. This algorithm uses basic features used in the shot segmentation algorithm so that it can be easily combined with the conventional shot segmentation algorithm. Also, it can be used as a basic input for shot clustering.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. A method of detecting dissolve/fade in an MPEG-compressed video environment, comprising:

detecting a candidate sequence that is presumed to use a dissolve/fade editing effect according to shot transition detection in a video sequence;

finding if spatio-temporal macro block type distribution that characteristically appears in a dissolve/fade sequence arises in the dissolve/fade candidate sequence, to judge if a scene transition by dissolve/fade was used in the detected dissolve/fade candidate sequence; and when the spatio-temporal macro block type distribution in the dissolve/fade sequence continuously appears in the dissolve/fade candidate sequence, comparing the length of the candidate sequence with a predetermined critical value and judging that the candidate sequence is a dissolve/fade sequence when its length is longer than the critical value, wherein the judging if the dissolve/fade editing effect was used in the candidate sequence using the spatio-temporal macro block type distribution uses spatio-temporal macro block type distribution and its variation characteristics in B-frames that simultaneously use bi-directional prediction in compression domain, and wherein the judging if the dissolve/fade editing effect was used in the candidate sequence using the spatio-temporal macro block type distribution comprises, setting B-frames whose macro block type distribution satisfies "B-frame macro block type characteristic in a dissolve/fade sequence" among the B-frames adjacent to the anchor frames in the dissolve/fade candidate sequence to a first prescribed value and setting other B-frames to a second prescribed value, and obtaining a run having a maximum length among the runs set to the first prescribed value.

2. The method as claimed in claim 1, wherein it is judged that there is a hard cut in the detected candidate sequence and, only when there is no hard cut, the process goes to the next step.

3. The method as claimed in claim 1, wherein the candidate sequence is judged to be the dissolve/fade sequence when a color histogram difference between the first frame and the last frame of a scene from which dissolve/fade is detected is larger than a predetermined threshold.

4. The method as claimed in claim 3, wherein frames serving as a base for comparison of global color distributions are selected by a method of selecting a frame of one-step interval from a reference frame, or selecting I-frames coded using only intra-coded blocks as candidate frames.

5. The method as claimed in claim 1, wherein the step of detecting the dissolve/fade candidate sequence is performed by a technique of using an image difference between two frames by using a difference in color histogram, a technique of using spatio-temporal macro block distribution, a technique of using spatio-temporal motion vector distribution, or a technique of using spatio-temporal edge distribution and its variation characteristic.

6. The method as claimed in claim 2, wherein the hard cut is detected by a method of using an image difference between two frames by using a difference in color histogram based global color distribution, a method of using spatio-temporal macro block distribution, a method of using spatio-temporal motion vector distribution, or a method of using spatio-temporal edge distribution and its variation form characteristics.

7. The method as claimed in claim 1, wherein the selected B-frames are adjacent to anchor frames on the basis of the anchor frames in the candidate sequence.

8. The method as claimed in claim 7, wherein the anchor frames are I-frames or P-frames serving as a base for motion prediction/compensation between frames.

9. The method as claimed in claim 1, wherein the first prescribed value is 1 and the second prescribed value is 0.

10. The method as claimed in claim 1, wherein "B-frame macro block type characteristic in a dissolve/fade sequence" is that the sum of the number of forward prediction macro blocks and the number of backward prediction macro blocks in corresponding B-frame is not equal to 0 and a larger value between forward prediction rate and backward prediction rate is larger than a threshold.

11. The method as claimed in claim 1, wherein "B-frame macro block type characteristic in a dissolve/fade sequence" is that one of the number of forward prediction macro blocks and the number of backward prediction macro blocks in corresponding B-frame is 0 or both are not equal to 0, and the forward prediction macro blocks and backward prediction macro blocks are globally scattered in the spatial domain.

12. The method as claimed in claim 1, wherein a function representing the spatial distribution inputs the number of connected components of a specific type macro block and the number of specific type macro blocks in an image, and it is decided by a value obtained by dividing the inputted number of connected components by the inputted number of the specific type macro blocks in the image.

13. The method as claimed in claim 11, wherein a function that induces the forward prediction macro blocks and backward prediction macro blocks to be globally scattered in the spatial domain is a function (spatial distribution measurement function) of judging that macro blocks of two types are globally scattered in the image of an image type macro block, the function having a higher value as the macro blocks of two types are more globally scattered, and it is judged that corresponding B-frame satisfies "B-frame macro block type characteristic in a dissolve/fade sequence" when the result of the function exceeds a threshold for the spatial distribution of the macro blocks.

14. The method as claimed in claim 11, wherein the spatial distribution measurement function selects a type in smaller numbers among the forward macro blocks and backward macro blocks to use it as an input, or selects a type in larger numbers among them to use it as an input.

15. The method as claimed in claim 1, wherein the dissolve/fade candidate sequence is judged to be fade-in when variance of colors for the first scene in the candidate sequence is lower than a predetermined threshold, it is judged to be fade-out when variance of colors for the last scene is lower than a threshold for discriminating fade-in and fade-out from each other, and it is judged to be dissolve in other eases.

16. The method as claimed in claim 15, wherein the variance of colors is based on diversity of colors constructing pixels in an image while brightness is based on diversity of colors constructing sampled pixels among pixels in an image.

17. A method of detecting dissolve/fade in an MPEG-compressed video environment, comprising:

detecting a candidate sequence that contains a dissolve/fade editing effect according to shot transition detection in a video sequence;

finding whether a spatio-temporal macro block type distribution that characteristically appears in a dissolve/fade sequence arises in the dissolve/fade candidate sequence;

comparing a duration of the found spatio-temporal macro block type distribution with a predetermined critical value when the found spatio-temporal macro block type distribution in the dissolve/fade sequence appears in the dissolve/fade candidate sequence; and judging that the candidate sequence includes the dissolve/fade sequence when the duration is greater than the critical value, wherein the judging that the candidate sequence includes the dissolve/fade sequence comprises, detecting sequences of B-frames that simultaneously use bi-directional prediction in a compression domain whose macro block type distribution satisfies "B-frame macro block type characteristic in a dissolve/fade sequence" among the B-frames in the dissolve/fade candidate sequence; and determining whether a duration of the detected sequences of B-frames is greater than the critical value.

18. The method as claimed in claim 17, wherein the detecting the dissolve/fade candidate sequence is performed by a technique of using an image difference between two frames by using a difference in color histogram, a technique of using spatio-temporal macro block distribution, a technique of using spatio-temporal motion vector distribution, or a technique of using spatio-temporal edge distribution and its variation characterstic.

19. The method as claimed in claim 17, wherein "B-frame macro block type characteristic in a dissolve/fade sequence" is that the sum of the number of forward prediction macro blocks and the number of backward prediction macro blocks in corresponding B-frame is not equal to 0 and a larger value between forward prediction rate and backward prediction rate is larger than a threshold.

20. The method as claimed in claim 17, wherein a function representing the spatial distribution inputs the number of connected components of a specific type macro block and the number of specific type macro blocks in an image, and it is decided by a value obtained by dividing the inputted number of connected components by the inputted number of the specific type macro blocks in the image.

21. The method as claimed in claim 9, wherein "B-frame macro block type characteristic in a dissolve/fade sequence" is that one of the number of forward prediction macro blocks and the number of backward prediction macro blocks in corresponding B-frames is 0 or both are not equal to 0, and the forward prediction macro blocks and backward prediction macro blocks are globally scattered in the spatial domain.

22. The method as claimed in claim 21, wherein a function that induces the forward prediction macro blocks and backward prediction macro blocks to be globally scattered in the spatial domain is a spatial distribution measurement function for judging that macro blocks of two types are globally scattered in the image of an image type macro block, the function having a higher value as the macro blocks of two types are more globally scattered, and it is judged that corresponding B-frame satisfies "B-frame macro block type characteristic in a dissolve/fade sequence" when the result of the function exceeds a threshold for the spatial distribution of the macro blocks.

23. The method as claimed in claim 21, wherein the spatial distribution measurement function selects a type in smaller numbers among the forward macro blocks and backward macro blocks to use it as an input, or selects a type in larger numbers among them to use it as an input.

24. An apparatus for detecting dissolve/fade in an MPEG-compressed video environment, comprising:

means for detecting a candidate sequence that contains a dissolve/fade editing effect according to shot transition detection in a video sequence;

means for finding whether a spatio-temporal macro block type distribution that characteristically appears in a dissolve/fade sequence arises in the dissolve/fade candidate sequence;

means for comparing a duration of the found spatio-temporal macro block type distribution with a predetermined critical value when the found spatio-temporal macro block type distribution in the dissolve/fade sequence appears in the dissolve/fade candidate sequence; and means for judging that the candidate sequence includes the dissolve/fade sequence when the duration is greater than the critical value, wherein the means for judging that the candidate sequence includes the dissolve/fade sequence comprises, means for detecting sequences of B-frames that simultaneously use bi-directional prediction in a compression domain whose macro block type distribution satisfies "B-frame macro block type characteristic in a dissolve/fade sequence" among the B-frames in the dissolve/fade candidate sequence; and means for determining whether a duration of the detected sequences of B-frames is greater than the critical value.

* * * * *